W. W. LYMAN.
Fruit Can.
No. 1,920. Reissued March 28, 1865.
Fig. 1,
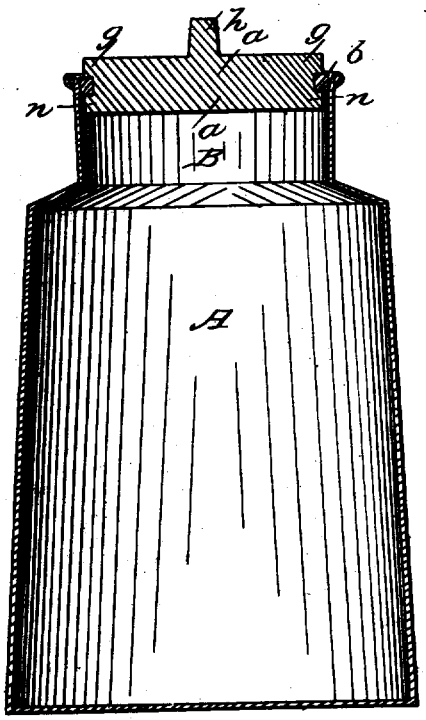
Fig. 2,
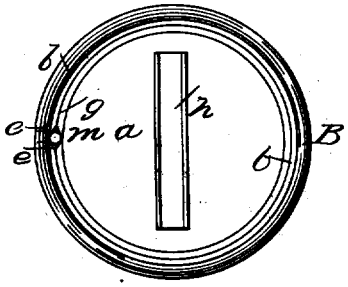
Fig. 3,
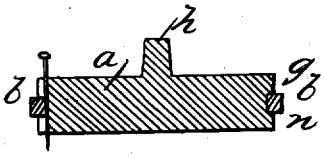
Witnesses:
Melville Biggs
W. L. Benson
Inventor:
William W. Lyman
by his Attorney
C. S. Renwick.
N. PETERS, Photo-Lithographer, Washington, D. C.

UNITED STATES PATENT OFFICE.

WM. W. LYMAN, OF WEST MERIDEN, CONNECTICUT.

IMPROVEMENT IN FRUIT-CANS.

Specification forming part of Letters Patent No. 35,529, dated June 10, 1862; Reissue No. 1,920, dated March 28, 1865.

*To all whom it may concern:*

Be it known that I, WILLIAM W. LYMAN, of West Meriden, in the county of New Haven and State of Connecticut, have invented certain new and useful Improvements in Fruit-Cans; and I do hereby declare that the following is a full, clear, and exact description of my said invention, reference being had to the accompanying drawings, in which—

Figure 1 represents a vertical transverse section of a fruit-can constructed according to my invention. Fig. 2 represents a plan of the stopper and neck of the same; and Fig. 3 represents a vertical transverse section of the stopper of the same, showing the manner of forming an air communication with the interior of the can by means of a pin inserted at the inner side of the elastic packing-ring.

The nature of this improvement consists in fitting the can with a stopper of proper size relatively to the neck of the can to admit (between the walls of the neck of the can and the said stopper) an elastic packing-ring of sufficient thickness to permit the formation of an air-passage across said packing-ring by the introduction of a pin or other suitable instrument at its side.

The invention consists, further, of the combination of the preceding part of the invention with a flange, for the purpose of keeping the elastic packing-ring in its place while the stopper is depressed in the neck of the can.

The invention consists, further, of the combination of the stopper of said can with a flange located beneath the position of the elastic packing-ring, so that when the stopper is withdrawn the elastic packing-ring is withdrawn with it.

The invention consists, further, of a recess in the flange which operates upon the ring, so as to permit the introduction of a pin or other suitable instrument at that side of the ring which the flange overlaps, for the purpose of opening an air communication with the interior of the can at that side, if desired.

The body A of the can is provided at top with a neck, B, to receive the stopper *a;* and the stopper *a* must be made sufficiently smaller in diameter than the interior of the neck of the can to permit of the introduction of a packing-ring, *b*, between the two. As the packing-ring must be compressed in order that it may pack the joint between the stopper and the neck tightly, the forms of the neck of the jar and stopper are such that the forcing of the stopper downward compresses the packing-ring. The thickness of the packing-ring, and consequently the relative sizes of the stopper and neck of the can, are not matters of indifference; because when the stopper is applied to the can it is a matter of great convenience to open a small air communication with the interior of the can past the packing-ring to permit the escape of air, and when the stopper is to be withdrawn from the can it is practically necessary that a similar communication should be opened to permit the entrance of air. If the packing-ring were as thin as paper, or even as card-board, it would not yield sufficiently to permit the introduction of a pin or similar instrument past its side to open such communication; hence the packing-ring must be thick enough for that purpose, and the diameter of the stopper where the ring fits it must be sufficiently smaller than the interior diameter of the neck to admit such a packing-ring. I have found that a difference of about five-sixteenths of an inch between the diameters of the stopper and interior of the neck (as represented in the drawings) is a good difference for this purpose when vulcanized india-rubber is used as the material for the packing-ring; and I prefer to make about that difference in the diameters of the stopper and interior of the neck at the places where they first bear upon the opposite sides of the ring.

As it is essential to my invention that the construction of the can and stopper should be such as to permit the introduction of a pointed instrument to open an air communication, it is essential that the form of the stopper be such that the space through which the instrument can be introduced is not covered over by a projecting part of the stopper. Hence the handle or haft *h* of the stopper is made so small that it does not cover the annular space between the periphery of the stopper and the neck of the can. When the stopper is applied to the can, the friction of the surfaces of the stopper and neck upon the opposite sides of the packing-ring tends to skew it or displace it. In order that the packing-ring may be prevented from skewing and from moving from its proper position during the insertion of the stopper, I make use of a flange, *g*, to resist its movement, and as I insert the packing-ring and stopper together, so that the tendency is to effect displacement by the movement of the packing-ring upward, this flange is so situated as to act upon the upper side of the packing-ring and prevent it from skewing or removing from its proper position during the insertion of the stopper.

It is not convenient to leave the packing-ring in the can when the stopper is removed, as the ring is liable to be smeared with the liquid contents of the can. I therefore apply a ring-flange, *n*, to the stopper beneath the position of the packing-ring, so that when the stopper is withdrawn the ring-flange bearing upon the under side of the packing-ring compels it to remove with the stopper.

It is convenient to have the means of inserting the pin *d* at the interior of the packing-ring, and as the withdrawing-flange *n* and the holding-flange *g* are both situated at the inner side of the packing-ring and overlap it I make a recess in them, as seen at *m*, Fig. 2, so that the pin can be introduced there, if desired, to form air-openings *e e*. When such a can is used, the fruit is inserted in it in a hot condition and the stopper is applied to the neck. If any difficulty is experienced in introducing the stopper by reason of the air within the can, a pin is introduced at one side of the packing-ring to open an air communication with the interior of the can and permit the escape of air. When the stopper is introduced a sufficient distance, the pin is withdrawn, and the packing-ring expanding closes the air communication, whereupon the contraction of the contents as they cool permits the pressure of the atmosphere to force the stopper inward and compress the packing-ring until the elasticity of the packing-ring resists further compression. When the can is to be opened, a pin is inserted past the side of the packing-ring, so as to open a communication with the interior of the can, and thereby relieve the stopper of the pressure of the atmosphere, whereupon the stopper can be withdrawn by means of its handle or haft *h*.

Having thus described a can constructed according to my invention, what I claim as new, and desire to secure by Letters Patent, is—

1. The combination of the can with a stopper of such size relatively to the neck of the can as to admit between the neck and stopper an elastic packing-ring of the requisite thickness to permit the introduction of a pin at its side, substantially as set forth.

2. The combination of the said can and the stopper with a flange, substantially as set forth, to prevent the skewing or displacement of the packing-ring when the stopper is applied to the can.

3. The combination of the stopper of the jar with a flange situated beneath the position of the packing ring, substantially as set forth.

4. The recess in the flange to permit the introduction of the pin at the side of the packing-ring which is overlapped by the flange, substantially as set forth.

WILLIAM W. LYMAN.

Witnesses:

HENRY M. FOSTER,
ORVILLE H. PLATT.